(12) United States Patent
Aninos

(10) Patent No.: US 9,765,803 B2
(45) Date of Patent: Sep. 19, 2017

(54) TELESCOPIC SUPPORT ROD

(71) Applicant: Nick Aninos, Ridgewood, NJ (US)

(72) Inventor: Nick Aninos, Ridgewood, NJ (US)

(73) Assignee: Nick Aninos, Ridgewood, NJ (US)

( * ) Notice: Subject to any disclaimer, the term of this patent is extended or adjusted under 35 U.S.C. 154(b) by 41 days.

(21) Appl. No.: 14/611,404

(22) Filed: Feb. 2, 2015

(65) Prior Publication Data

US 2016/0223000 A1     Aug. 4, 2016

(51) Int. Cl.
*F16B 7/10*     (2006.01)
*A47B 45/00*    (2006.01)
*A47H 1/022*    (2006.01)
*A47H 1/02*     (2006.01)

(52) U.S. Cl.
CPC .............. *F16B 7/105* (2013.01); *A47B 45/00* (2013.01); *A47H 1/022* (2013.01); *A47H 2001/0215* (2013.01)

(58) Field of Classification Search
CPC .. A47H 1/022; A47H 2001/0215; A47B 9/00; A47B 9/083; A47B 9/06; A47B 9/14; A47B 45/00; F16B 7/105; F16B 7/14; F16B 7/1463
USPC ........................................................ 211/175
See application file for complete search history.

(56) References Cited

U.S. PATENT DOCUMENTS

| | | | | | |
|---|---|---|---|---|---|
| 390,406 | A | * | 10/1888 | Sittig ........................ | A47C 3/26 108/146 |
| 1,370,732 | A | * | 3/1921 | Corbett .................. | A47B 91/02 108/146 |
| 3,113,793 | A | * | 12/1963 | Harwood ................. | A47C 3/28 248/161 |
| 3,217,672 | A | * | 11/1965 | Haughey .................. | A47B 9/12 108/106 |
| 4,627,591 | A | * | 12/1986 | Heckmann ............... | A47B 9/06 108/148 |
| 2005/0279261 | A1 | * | 12/2005 | Lo .......................... | A47B 9/083 108/147 |
| 2007/0215781 | A1 | * | 9/2007 | Watt .................... | A63B 22/0046 248/622 |

* cited by examiner

*Primary Examiner* — Ko Hung Chan
*Assistant Examiner* — Korie H. Chan
(74) *Attorney, Agent, or Firm* — Carson C. K. Fincham; Fincham Downs, LLC

(57) ABSTRACT

Systems and methods for adjustable telescopic support rods are provided. Specifically, the telescopic support rods in accordance with some embodiments comprise selectably modifiable indexed lengths having no externally visible indication of the indexing means. Methods for modulating the length of the support rod and its use in, for example, vertical support for scaffolding and shelving units are also provided.

19 Claims, 5 Drawing Sheets

TELESCOPIC SUPPORT ROD

BACKGROUND

The widths or heights of spaces to be covered with curtains or drapes, or shelving systems and scaffolding vary greatly. In order to accommodate such spaces, fixed length support rods must be made in a correspondingly large number of lengths and heights. Because it is economically impractical for rod and or scaffolding and other support column suppliers to stock rods in such a large number of sizes, fixed rods must often be custom made thereby increasing their cost and resulting in an often undesirable delay before the rods are available for use.

The aforementioned problems associated with fixed rods and other support columns have generally been overcome through the use of adjustable rods. Typically, rods having multiple segments can be provided as slidably connected whereby one segment (the nested member) can be received in another (the nesting member) for telescoping movement to extend or retract the multi-segmented rod over a continuous range between a minimum length and a maximum length.

For a more accurate selection of length, as well as the ability to support more weight, many such adjustable-length rods are indexed via the use of openings in the nesting member, with a biased detent of the nested member configured to extend into a selected one of the openings, fixing the length of the adjustable rod.

Other solutions involve the use of bars inserted into aligned openings in both the nested and nesting members, or friction coupling and other similar couplers that, if the rod is used to vertically support weight, may require the use of external tools to shorten or lengthen the rod as desired. Moreover, protrusions on the external surface of the rods may be disadvantageous, either for aesthetic reasons, or for free motion of components coupled to the rod when that motion is desired.

Accordingly, there is a need for an improved adjustable indexed rod, such as a telescopic rod having a substantially smooth exterior surface, and/or that does not require external tools for adjusting the length thereof.

BRIEF DESCRIPTION OF THE DRAWINGS

The features of the telescopic support rod with selectably modifiable indexed length and methods of use thereof as described herein will become apparent from the following detailed description when read in conjunction with the drawings, which are exemplary, not limiting, and wherein like elements are numbered alike in several figures and in which.

DETAILED DESCRIPTION

In some embodiments, a telescopic support rod comprises a selectably modifiable indexed length and/or may comprise no visible indication of the indexing components (e.g., the indexing components may be entirely internal and/or enclosed within the telescopic rod and/or portions thereof).

In some embodiments for example, an indexed telescoping support rod may comprise (i) a nesting member, wherein the nesting member comprises a longitudinal axis, a base (or first end), a top (or second end), and/or a plurality of parallel recesses opening to an internal cylindrical volume, the recesses disposed in an anterior column (or first column) and a posterior column (or second column), (ii) a nested member, wherein the nested member is configured to slidably couple to the nesting member, the nested member comprising a longitudinal axis, a base (or first end), a top (or second end), and a pawl operably coupled to the base of the nested member, the pawl comprising a pair of outwardly biased, opposed arms (e.g., diametrically opposed), each arm comprising a ventral surface, a dorsal surface, a proximal end (or first end), a distal end (or second end), and a shelf carved into the dorsal surface of each arm, wherein the recesses are configured to receive and engage the distal end of each of the arms of the pawl and wherein the shelves of the arms of the pawl are configured to support (and/or receive) the base (or first end) of the nested member.

Figure 1A:
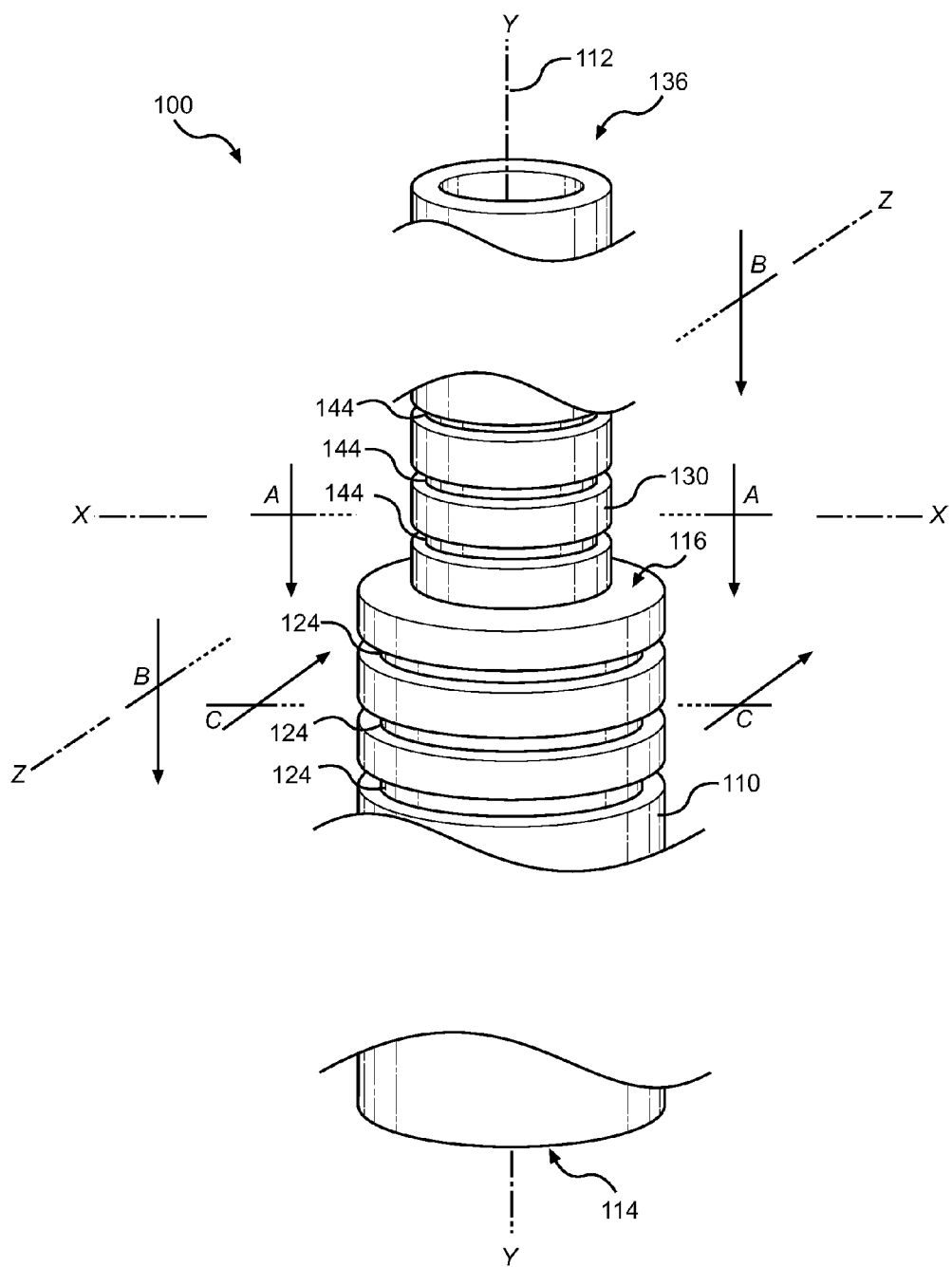
FIG. 1A is a top perspective view of a telescopic support rod system according to some embodiments.

Turning now to FIG. 1A, a top (and, e.g., partial) perspective view of a telescopic support rod system 100 according to some embodiments is shown. As depicted, the telescopic support rod system 100 is oriented in a three-dimensional (3-D) coordinate system defined by x, y, and z axes. Also referring to FIG. 1B, a cross-section A-A (depicting a two-dimensional (2-D) view along the x and y axes) of the telescopic support rod system 100 of FIG. 1A according to some embodiments is shown. In some embodiments, the telescopic support rod system 100 comprises a nesting member 110 (e.g., depicted as a tubular member), the nesting member 110 being oriented to (and/or comprising) a longitudinal axis 112 that is oriented along the y-axis, a base 114 (or first end), a top 116 (or second end), and/or a plurality of parallel recesses 118 opening to an internal volume 120 (e.g., a cylindrical volume in the case of a cylindrical tube configuration of the nesting member 110), the internal volume 120 defining an internal nesting member diameter 120-1. According to some embodiments, the parallel recesses 118 may be disposed and/or arranged in a first column 122a (or anterior column) and a second column 122b (or posterior column). In some embodiments, the parallel recesses 118 may be disposed or oriented in pairs (e.g., one parallel recess 118 from each of the first and second columns 122a-b), such as at diametrically opposed positions at corresponding y-axis coordinates (such as the depicted "$Y_1$" coordinate) within the internal volume 120. According to some embodiments, the parallel recesses 118 (and/or pairs thereof) provide an indexing mechanism for the telescopic support rod system 100. In some embodiments, the nesting member 110 may comprise a plurality of circumferential grooves 124 (e.g., on an external surface thereof; such as to receive a transverse member (not shown) having an arcuate rail (also not shown) extending therefrom, such as defining a lateral shelf support coupled to the nesting member 110).

According to some embodiments, the telescopic support rod system 100 may comprise a nested member 130. The nested member 130 can be configured, for example, to be coupled to (e.g., frictionally slidably coupled to) nesting member 110. The nested member 130 may be oriented to (and/or comprise) the longitudinal axis 112 (oriented along the y-axis) and/or may comprise, for example, a base 134 (or first end) and a top 136 (or second end). In some embodiments, the nested member 130 may be tubular (as depicted) and may accordingly define an internal volume 140 (e.g., a cylindrical volume in the case of a cylindrical tube configuration of the nested member 130), the internal volume 140 defining an internal nested member diameter 140-1. According to some embodiments, the nested member 130 may comprise a plurality of circumferential grooves 144 (e.g., on an external surface thereof; such as to receive a transverse member (not shown) having an arcuate rail (also not shown) extending therefrom, such as defining a lateral shelf support coupled to the nested member 130). In some embodiments, the nested member 130 may comprise one or more external surface detents 146 such as to prevent the nested member 130 from becoming unintentionally or accidentally disengaged or uncoupled from the nesting member 110 (described in more detail with respect to FIG. 10 herein).

Figure 1B:
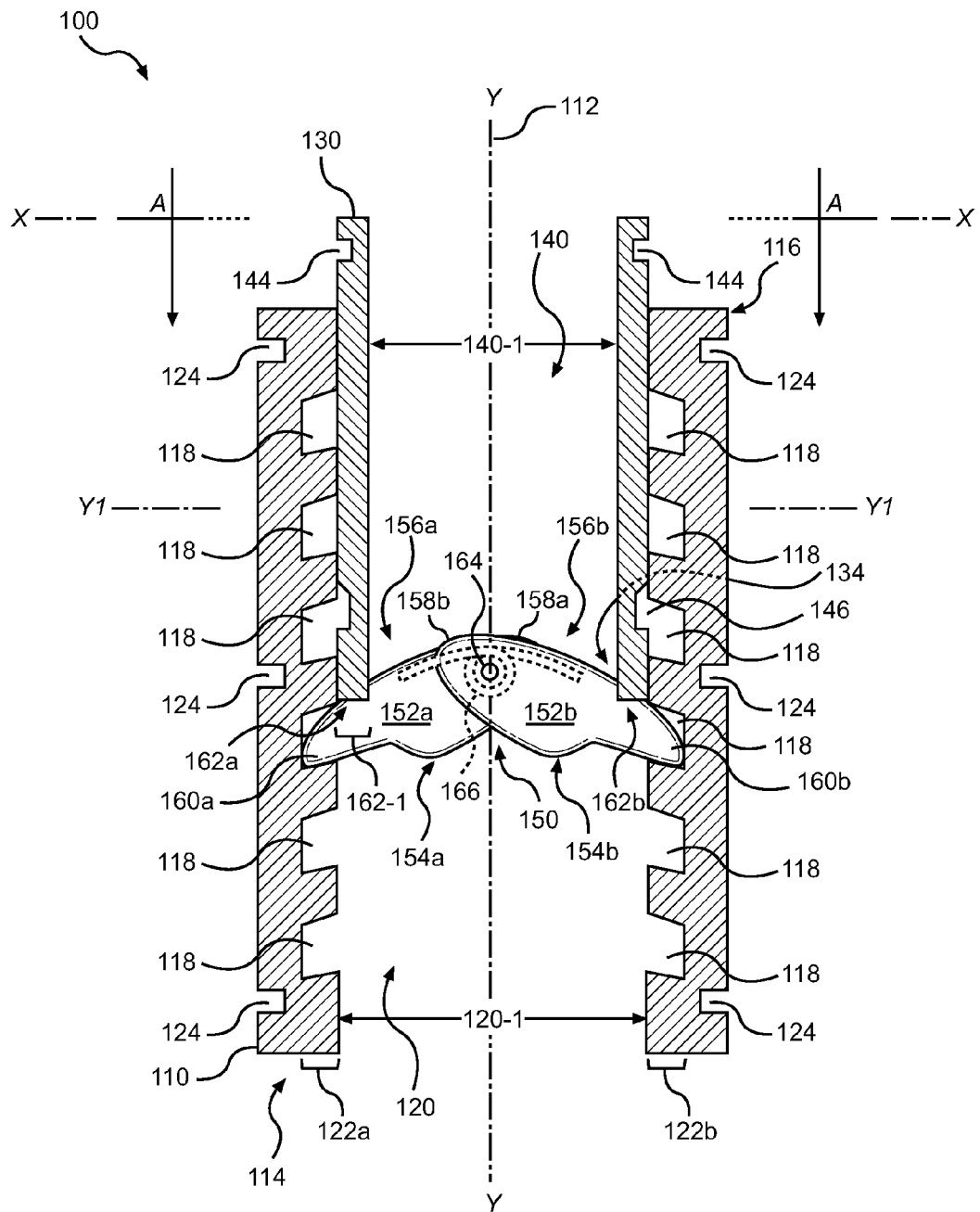
FIG. 1B is a cross-section A-A of the telescopic support rod system of FIG. 1A, with a first orientation of the components thereof (e.g., with an engaged pawl), according to some embodiments.

In some embodiments, the nested member 130 may comprise a pawl 150 operably coupled to base 134 of the nested member 130. The pawl 150 may comprise, for example, a pair of outwardly biased and/or opposed (or diametrically opposed) arms 152a-b (or wings), each arm 152a-b comprising and/or defining a ventral surface 154a-b, a dorsal surface 156a-b, a proximal end 158a-b, a distal end 160a-b, and/or a shelf 162a-b (or a seat; e.g., carved, cut into, and/or otherwise formed into the dorsal surface 156a-b of each arm 152a-b). As illustrated in FIG. 1B, each pair of parallel recesses 118 may be configured to receive and engage the distal ends 160a-b of each of arms 152a-b of the pawl 150. In some embodiments, the shelves 162a-b may be configured and/or oriented to support the base 134 of the nested member 130 (e.g., in the case that the y-axis is oriented parallel or coincident with a gravitational force operating in a downward y-direction as oriented in FIG. 1A and FIG. 1B). According to some embodiments, the arms 152a-b of the pawl 150 may be moveably and/or rotatably coupled by a hinge 164 (e.g., a pin member as depicted). In some embodiments, the hinge 164 may retain, mount, and/or couple to a biasing member 166 (such as a spring) that exerts force (e.g., in the positive y-direction, generally) on the dorsal surfaces 156a-b of the arms 152a-b (e.g., thereby biasing the distal ends 160a-b of the arms 152a-b against the nesting member 110 and/or parallel recesses 118 thereof).

In some embodiments, each shelf 162a-b of the dorsal surfaces 156a-b of the arms 152a-b of the pawl 150 may form a step with an arcuate rise configured to match a curvature of the internal diameter of nested member 130 and thus abut at least a portion of the internal surface of the base 134 of the nested member 130. According to some embodiments, each shelf 162a-b of each arm 152a-b of the pawl 150 may be configured to have a length or run 162-1 that has a span approximately equal to (e.g., within two percent (2%), plus or minus, of) a difference between the internal nesting member diameter 120-1 of the nesting member 110 and the internal nested member diameter 140-1 of the nested member 130 (i.e., $Shelf_{run} \approx Nesting_{IntDia} - Nested_{IntDia}$).

Figure 1C:
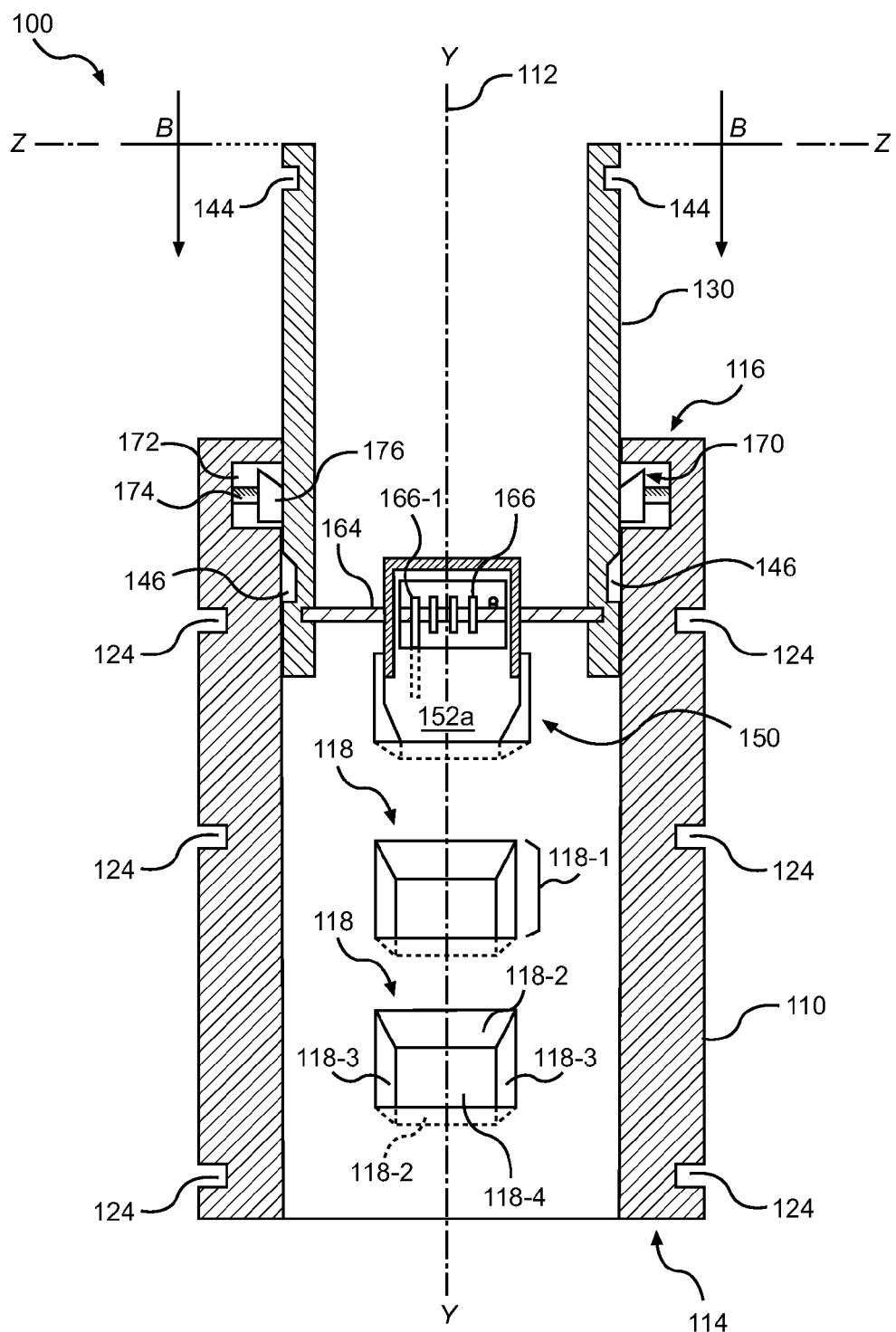
FIG. 1C is a cross-section B-B of the telescopic support rod system of FIG. 1A, according to some embodiments.

Referring now to FIG. 1C, a cross-section B-B (depicting a two-dimensional (2-D) view along the z and y axes) of the telescopic support rod system 100 of FIG. 1A, according to some embodiments is shown. As illustrated in FIG. 1B and FIG. 1C, the plurality of parallel recesses 118 may be arranged in a plurality of horizontal (e.g., homogeneous y-coordinate) pairs disposed axially in the anterior column 122a and the posterior column 122b such that the parallel recesses 118 are axially aligned in pairs (along the y-axis), providing predetermined indexing for the telescopic support rod system 100. According to some embodiments, each parallel recess 118 may define a quadrilateral, frusto-pyramidal volume having open rectangular base 118-1, a pair of parallel opposing trapezoidal walls 118-2 (e.g., disposed perpendicular to the longitudinal axis 112), a pair of opposing parallel rhomboid (e.g., side) walls 118-3 (e.g., disposed in parallel with the longitudinal axis 112), and/or a closed rectangular apex 118-4. In some embodiments, the closed rectangular apex 118-4 may be disposed closer to the base 114 of the nesting member 110 than the open rectangular base 118-1. As illustrated in FIG. 1C, the rhomboid (e.g., side) walls 118-3, depict a slope of the parallel recess 118 towards the base 114 of the nesting member 110. In the case that the telescopic support rod system 100 is implemented in a vertically-oriented manner, such as to support a horizontal shelving unit (not shown), the force borne by the biasing member 166 of the pawl 150 is minimized and the shelves 162a-b bear most of the weight.

According to some embodiments, the distal end 160a of a first one of the arms 152a of the pawl 150 may be beveled (e.g., with respect to the z-axis; although not explicitly depicted in FIG. 1C, a second one of the arms 152b may also or alternatively be beveled in some embodiments). In some embodiments, a slope angle of the beveled distal end(s) 160a-b may be configured, for example, to match a slope of the lateral walls 118-3 of the parallel recesses 118. In the case that the parallel recesses 118 comprise frusto-pyramidal shaped detents, for example, the beveling of the distal end(s) 160a-b may assist or facilitate in the engagement of the arms 152a-b with paired parallel recesses 118, e.g., upon alignment of the arms 152a-b with the pair of parallel recesses 118.

In some embodiments, the detent(s) 146 may comprise and/or be defined by an apically beveled circumferential grove, e.g., circumnavigating the outside surface and/or diameter of the nested member 130. The detent(s) 146 may comprise, for example, a right angle trapezoidal cross-section, wherein an internal right angle is formed and/or defined at the portion of the detent 146 closer to the base 134 of the nested member 130 (and a second right angle is formed at the interface of the detent 146 and the internal surface of the nesting member 130).

According to some embodiments, the telescopic support rod system 100 may comprise a detent mechanism 170 that may be configured to engage the detent(s) 146 and prevent the separation of the nesting member 110 and the nested member 130. The term "detent mechanism" is intended broadly to encompass any system for biasing a first element into one or more selected positions with respect to a second element, whether or not the mechanism includes a detent ball. As illustrated, the detent mechanism 170 comprises a detent recess 172 (within the interior wall of the nesting member 110), a detent biaser 174, and a detent member 176. In some embodiments, the detent biaser 174 may be coupled between and/or join the interior wall of the detent recess 172 and the detent member 176. According to some embodiments, the detent member 176 is configured to be biased into an apically beveled circumferential groove defining and/or comprising the detent(s) 146, and prevent the apical movement of the nested member 130 beyond a predetermined overlap with nesting member 110 and thus prevent complete separation and decoupling of the nesting member 110 and the nested member 130. In some embodiments, the detent member 176 may be configured to comprise a right angle trapezoid cross section that is complementary to the cross section of the detent(s) 146. According to some embodiments, the detent biaser 174 may comprise a spring (e.g., a coil spring), resilient elastomeric member, a pair of same-pole-facing magnets, other practicable biasing means, and/or any portions or combinations thereof.

Another mechanism (not shown) that can be utilized to prevent the axial movement of the nested member 130 apically beyond a predetermined axial position can be, for example, a rim (not shown) disposed toward the base 134 of the nested member 130 and a flange (also not shown) disposed on the top 116 of the nesting member 110. This arrangement would require that the outer diameter of nested member 130 be approximately equal to an internal diameter of the opening defined by the flange, while the outer diameter of the rim would be approximately equal to the internal nesting member diameter 120-1 of the nesting member 110.

The axial location of the detent(s) 146 toward the base 134 of the nested member 130 may be configured to provide a predetermined axial overlap between the nesting member 110 and the nested member 130. In some embodiments, the overlap may be configured to be between about five percent (5%) and about ten percent (10%), referring to an axial ratio between (i) the axial length of difference between the base 134 of the nested member 130 and the top 116 of the nesting member 110 and (ii) the axial length of the nesting member 110. The degree of overlap can depend on, for example, expected or designed load on the telescopic support rod system 100, whether the telescopic support rod system 100 is positioned vertically or horizontally, and like factors. According to some embodiments, the detent member 176 may comprise a frontal facet (in other words, the small base of a trapezoid) that is larger than the opening of the detent(s) 146, such as to prevent engagement of the detent member 176 in the detent(s) 146 (if present). In some embodiments, the detent mechanism 170 may be configured to provide additional friction between the nesting member 110 and nested member 130. Additional friction can be provided by configuring the detent member 176 with a front facet (not shown) using, for example, an elastomeric coating. In the case that the nesting member 110 is heavy, it may be beneficial to provide additional friction to prevent accidental extension during adjustment procedure, by providing for example, additional friction.

Figure 1D:
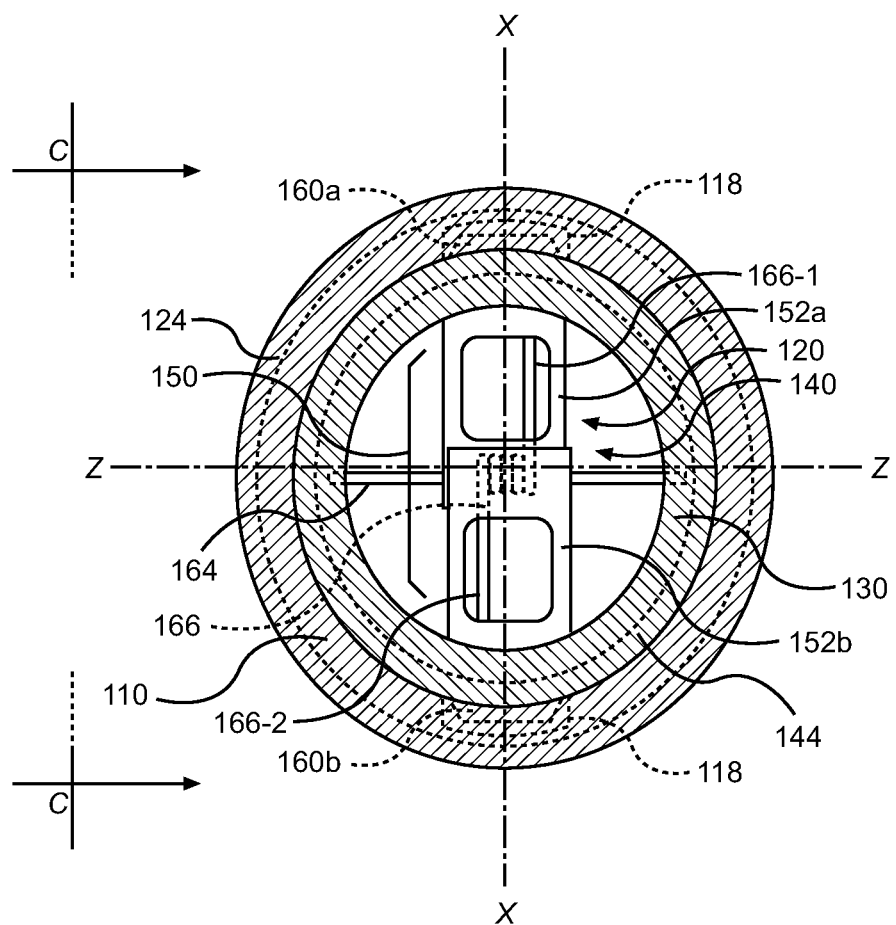
FIG. 1D, is a cross-section C-C of the telescopic support rod system of FIG. 1A according to some embodiments.

Turning now to FIG. 1D, a cross-section C-C (depicting a two-dimensional (2-D) view along the x and z axes) of the telescopic support rod system 100 of FIG. 1A according to some embodiments is shown. As illustrated, the telescopic support rod system 100 may comprise the nesting member 110, plurality of parallel recesses 118 opening to the internal volume 120 of the nesting member 110, such parallel recesses 118 being horizontally aligned in pairs (e.g., aligned along the x-axis (and/or the y-axis)). In some embodiments, the nested member 130 is frictionally slidably coupled to the nesting member 110. As illustrated in FIG. 1D for example, the telescopic support rod system 100 may comprise the pawl 150 operably coupled to the base 134 (not shown in FIG. 1D, see e.g., FIG. 1B and FIG. 1C) of the nested member 130. In some embodiments, the pawl 150 may comprise the arms 156a-b that are outwardly biased via utilization of the biasing member 166.

Figure 1E:
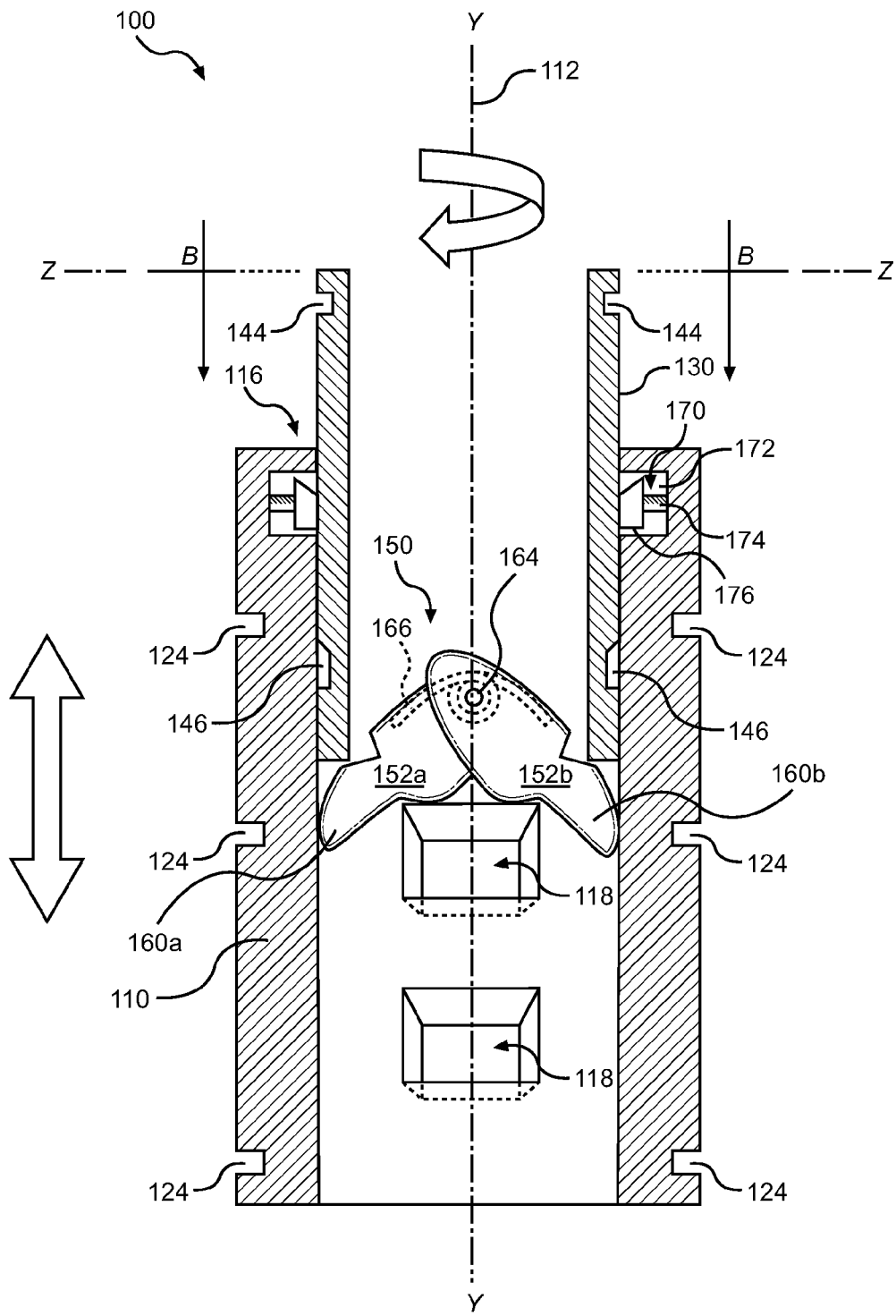
FIG. 1E, is a cross-section A-A of the telescopic support rod system of FIG. 1, with a second orientation of the components thereof (e.g., with a disengaged pawl), according to some embodiments.

In some embodiments, the indexed telescopic support rods described herein, can be adjusted using the methods provided herein. Turning to FIG. 1E, for example, provided and illustrated herein is a method of selectably modulating the length of the telescopic support rod system 100, wherein distal ends 160a-b of the arms 152a-b of the pawl 150 are engaged in corresponding parallel recesses 118 (e.g., in accordance with a first orientation, such as depicted in FIG. 1B—where the arms 152a-b of the pawl 150 are biased outwardly along the x-axis and accordingly engaged with the parallel recesses 118 disposed along the x-axis interior of the nesting member 110). According to some embodiments, a method comprises, axially translating the nested member 130 relative to the nesting member 110 axially toward the top 116 of the nesting member 110 until the distal ends 160a-b of the arms 152a-b of the pawl 150 disengage from the anterior column 122a and posterior column 122b parallel recesses 118 (e.g., a pair) of the nesting member 110 (e.g., as depicted in FIG. 1E, in accordance with a second orientation, where the arms 152a-b of the pawl 150 are biased outwardly along the z-axis and accordingly engaged with the smooth interior surfaces of the nesting member 110). Once the distal ends 160a-b of the arms 152a-b of the pawl 150 disengage from the anterior column 122a and posterior column 122b parallel recesses 118 in the nesting member 110, the user can radially translate (in other words, rotate) the nested member 130 relative to nesting member 110 between about eight tenths of a radian (0.8 rad; about forty-five degrees (45°) off the engagement point) and about two and four tenths of a radian (2.4 rad; about one hundred and thirty-five degrees (135°) off the engagement point). According to some embodiments, once the distal ends 160a-b of the arms 152a-b of the pawl 150 are disengaged from the anterior column 122a and posterior column 122b parallel recesses 118 in the nesting member 110, the dorsal surfaces 156a-b of the arms 152a-b of the pawl 150 abut the internal wall of nesting member 110, e.g., without much resistance (e.g., free of the parallel recess 118 and subject only to sliding forces along the smooth portions of the interior surface of the nesting member 110). The user can then axially translate (extend or retract) the nested member 130 relative to the nesting member 110 toward the top 116 to lengthen (extend) the telescopic support rod system 100, or toward the base 114 to shorten (retract) the telescopic support rod system 100 to achieve a selectable indexed length. Upon arriving at the desired (selectable) length, the user can then radially translate (rotate) the nested member 130 relative to the nesting member 110 until the distal ends 160a-b of the arms 152a-b of the pawl 150 align with an accordingly engage with and are received by or in the anterior column 122a and posterior column 122b parallel recesses 118 in the nesting member 110 corresponding to the selectably modulated and indexed length.

In some embodiments, provided herein are systems and methods for a scaffolding kit, a shelving kit, a curtain rod, a ladder, a tripod, and/or a furniture leg, each comprising the indexed telescopic support rod system as described herein. Other supports, rods, and/or tubes or structural members may also or alternatively be provided in accordance with the selectively telescopic components and features as described herein.

The present disclosure is not limited to the particular embodiments described, as they are provided for exemplary and illustrative purposes only. All modifications, equivalents, and alternatives of the illustrated embodiments are contemplated herein. Specific structural and functional details disclosed herein are not to be interpreted as limiting but merely as a basis for illustration and providing examples of how to variously employ the present technology in virtually any appropriately detailed structure. Further, the terms and phrases utilized herein are not generally intended to be limiting but rather to provide an understandable and enabling description. While not generally limiting and while not limiting for all described embodiments, in some embodiments, the terms and phrases utilized herein are specifically limited to the example definitions and/or examples provided.

The drawings are not intended to indicate relative size and dimensions of the devices or components thereof and/or to define or limit the scope of the exemplary embodiments. Likewise, cross-sections are referred to on normal orthogonal coordinate apparatus having x, y, and z axes, such that the y-axis refers to up-and-down, the x-axis refers to side-to-side, and the z-axis refers to front-to-back. Although specific terms are used in the description for the sake of clarity, these terms are intended to refer only to the particular structure of the embodiments selected for illustration in the drawings, and are not intended to define or limit the scope of the disclosure.

The terms "first," "second," and the like, herein do not denote any order, quantity, or importance (unless otherwise specifically noted), but rather are used to denote one element from another. The terms "a", "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the groove(s) includes one or more groove). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

In addition, for the purposes of the present disclosure, directional or positional terms such as "top", "bottom", "upper," "lower," "side," "front," "frontal," "forward," "rear," "rearward," "back," "trailing," "above," "below," "left," "right," "radial," "vertical," "upward," "downward," "outer," "inner," "exterior," "interior," "intermediate," etc., are merely used for convenience in describing the various embodiments of the present disclosure.

One or more components may be referred to herein as "configured to," "configured by," "configurable to," "operable/operative to," "adapted/adaptable," "able to," "conformable/conformed to," etc. The terms (e.g. "configured to") can generally encompass active-state components and/or inactive-state components and/or standby-state components, unless context requires otherwise. Also, the term "slidably coupled", or "slidably" can be used in its broadest sense to refer to elements which are coupled in a way enabling one element to slide or translate with respect to another element.

It should be understood, that although the description and drawings focus on nested tubular members, and particularly cylindrically tubular members, hollow members of other various cross-sectional shapes such as "C"-shaped, "L"-shaped, and/or "U"-shaped may also or alternatively be utilized without deviating from the scope of some embodiments.

Biasing members or devices described herein may comprise any type, number, and/or configuration of biasing member that is or becomes known or practicable, such as (but not limited to) leaf spring(s), torsion springs, linear springs, magnets, magnetic arms wherein the magnets can be coupled to the arms with the same poles facing each-other, rubber bands, and/or any portions and/or combinations thereof.

As utilized herein, the term "indexed" generally refers to a configuration in which one or more members and/or components of a telescopic rod are designed to selectably determine the overall length of a telescopic rod system and/or that the positions of the nested member and the nesting member are predetermined relative to one another.

Also as utilized herein, the term "coupled", including its various forms such as "operably coupled", "coupling" or "coupleable", generally refers to any direct or indirect structural or mechanical coupling, connection or attachment, or adaptation or capability for such a direct or indirect structural or operational coupling, connection or attachment, including integrally formed components and components which are coupled via or through another component or by the forming process (e.g., an electromagnetic field). Indirect coupling may involve coupling through an intermediary member or adhesive, or abutting and otherwise resting against, whether frictionally (e.g., against a housing) or by separate means without any physical connection.

The term "engage" and various forms thereof, when used with reference to an engaging element, for example in the engagement of pawl arms, refers in an embodiment to the application of any forces that tend to hold arms, and recesses together against inadvertent or undesired separating forces (e.g., such as may be introduced during use of indexed telescopic support rod). It is to be understood, however, that engagement does not in all cases require an interlocking connection that is maintained against every conceivable type or magnitude of separating force. Likewise, the term "engage" when used with reference to engagement of a detent member, refers in an embodiment to the application of any forces that tend to hold the detent member, and apically beveled circumferential groove together against inadvertent or undesired separating forces. Further, the term "engaging element" refers in another embodiment to one or a plurality of coupled components, at least one of which is configured for releasably engaging another element. Thus, this term encompasses both single part engaging elements and multi-part-assemblies, for example the detent mechanism 170.

While in the foregoing specification telescopic support rod with selectably modifiable indexed length having no visible indication of the indexing means have been described in relation to certain preferred embodiments, and many details are set forth for purpose of illustration, it will be apparent to those skilled in the art that the disclosure of telescopic support rod with selectably modifiable indexed length having no visible indication of the indexing means and their methods of use are susceptible to additional embodiments and that certain of the details described in this specification and as are more fully delineated in the following claims can be varied considerably without departing from the basic principles of this invention.

What is claimed is:

1. An indexed telescoping support rod comprising:
   a nesting tubular member comprising a longitudinal axis, a base, a top, and a plurality of parallel recess pairs opening to an internal cylindrical volume, the recess pairs disposed in an anterior column and a posterior column, wherein an external surface of the nested tubular member comprises at least one circumferential groove;

a nested tubular member being frictionally slidably coupled to the nesting tubular member, the nested tubular member having a longitudinal axis, a base, and a top; and a pawl operably coupled to the base of the nested tubular member, the pawl comprising a pair of outwardly biased, diametrically opposed arms, each arm comprising a ventral surface, a dorsal surface, a proximal end, a distal end, and a shelf formed in the dorsal surface thereof, wherein each recess pair is configured to receive and engage the distal end of each of the pawl arms and wherein the shelf is configured to support the base of the nested tubular member.

2. The indexed telescoping support rod of claim 1, wherein the at least one circumferential groove of the external surface of the nesting tubular member comprises a plurality of circumferential grooves.

3. The indexed telescoping support rod of claim 1, wherein the pawl is hingedly coupled to the base of the nested tubular member.

4. The indexed telescoping support rod of claim 1, wherein the pair of diametrically opposed arms are outwardly biased with a torsion spring.

5. The indexed telescoping support rod of claim 1, wherein the pair of diametrically opposed arms are outwardly biased with a leaf spring.

6. The indexed telescoping support rod of claim 1, wherein the shelf formed in the dorsal surface of each arm of the pawl forms a step with an arcuate rise configured to abut the internal surface of the base of the nested tubular member.

7. The indexed telescoping support rod of claim 6, wherein the shelf has a run that is equal to the difference between the internal diameter of the nesting tubular member and the internal diameter of the nested tubular member.

8. The indexed telescoping support rod of claim 1, wherein the distal end of each of the pair of diametrically opposed arms is beveled.

9. The indexed telescoping support rod of claim 1, wherein the plurality of parallel recesses disposed axially in the anterior column and the posterior column, each define a quadrilateral, frusto-pyramidal volume comprising:
(i) an open rectangular base;
(ii) a pair of opposing trapezoidal walls disposed perpendicular to the longitudinal axis;
(iii) a pair of opposing rhomboid walls disposed in parallel with the longitudinal axis; and
(iv) a closed rectangular apex, wherein the rectangular apex is disposed closer to the base of the nesting tubular member than the open rectangular base of the recess.

10. An indexed telescoping support rod, comprising:
a nesting tubular member comprising a longitudinal axis, a base, a top, and a plurality of parallel recess pairs opening to an internal cylindrical volume, the recess pairs disposed in an anterior column and a posterior column;
a nested tubular member being frictionally slidably coupled to the nesting tubular member, the nested tubular member having a longitudinal axis, a base, and a top;
a pawl operably coupled to the base of the nested tubular member, the pawl comprising a pair of outwardly biased, diametrically opposed arms, each arm comprising a ventral surface, a dorsal surface, a proximal end, a distal end, and a shelf formed in the dorsal surface thereof, wherein each recess pair is configured to receive and engage the distal end of each of the pawl arms and wherein the shelf is configured to support the base of the nested tubular member;
a detent mechanism disposed apically on the nesting member; and
an apically beveled circumferential groove disposed toward the base of the nested member, wherein the detent mechanism is configured to be received in and engage the apically beveled circumferential groove, thereby preventing the apical movement of the nested tubular member beyond a predetermined axial position of the apically beveled circumferential groove.

11. The indexed telescoping support rod of claim 10, wherein the predetermined axial position of the apically beveled circumferential groove is configured to provide a minimum axial overlap of the nested tubular member and the nesting member of between 5% and 10%.

12. A method of selectibly modulating the length of an indexed telescoping support rod, the support rod comprising:
(i) a nesting tubular member comprising a longitudinal axis, a base, a top, and a plurality of parallel recess pairs opening to an internal cylindrical volume, the recess pairs disposed in an anterior column and a posterior column;
(ii) a nested tubular member being frictionally slidably coupled to the nesting tubular member, the nested tubular member having a longitudinal axis, a base, and a top; and
(iii) a pawl operably coupled to the base of the nested tubular member, the pawl comprising a pair of outwardly biased, diametrically opposed arms, each arm comprising a ventral surface, a dorsal surface, a proximal end, a distal end, and a shelf formed in the dorsal surface thereof, wherein each recess pair is configured to receive and engage the distal end of each of the pawl arms and wherein the shelf is configured to support the base of the nested tubular member;
wherein the distal end of each of the pawl arms is engaged in the recesses comprising:
a. axially translating the nested tubular member relative to the nesting tubular member axially toward the apical end of the nesting member until the distal end of each of the pawl arms disengage from the anterior and posterior pair of recesses in the nesting tubular member;
b. upon disengagement of the distal end of the pawl arms from the anterior and posterior pair of recesses in the nesting tubular member, radially translating the nested tubular member relative to the nesting tubular member between about 0.8 rad. and about 2.4 rad.;
c. axially translating the nested tubular member relative to the nesting tubular member toward the apical end to lengthen the telescopic support rod, or toward the base to shorten the telescopic support rod to achieve a selectable length; and
d. radially translating the nested tubular member relative to the nesting tubular member until the distal end of each of the pawl arms are engaged in the anterior and posterior pair of recesses in the nesting tubular member corresponding to the selectably modulated length.

13. The method of claim 12, wherein the external surface of the nesting tubular member and the nested tubular member, each further comprises a plurality of circumferential grooves.

14. The method of claim 12, wherein the pair of diametrically opposed arms are outwardly biased with a torsion spring or a leaf spring.

15. The method of claim 12, wherein the shelf formed in the dorsal surface of each arm forms a step with an arcuate rise configured to abut the internal surface of the base of the nested tubular member, and a run that is about equal to the difference between the internal diameter of the nesting tubular member and the internal diameter of the nested tubular member.

16. The method of claim 12, wherein the plurality of parallel recesses disposed axially in the anterior column and the posterior column, each define a quadrilateral, frusto-pyramidal volume comprising:
   (i) an open rectangular base,
   (ii) a pair of opposing trapezoidal walls disposed perpendicular to the longitudinal axis;
   (iii) a pair of opposing rhomboid walls disposed in parallel with the longitudinal axis; and
   (iv) a closed rectangular apex, wherein the rectangular apex is disposed closer to the base of the nesting tubular member than the open rectangular base of the recess.

17. The method of claim 12, wherein the nesting member further comprises a detent mechanism, configured to engage the nested tubular member and prevent the nested tubular member from translating apically beyond a predetermined axial position.

18. The method of claim 17, wherein the detent mechanism comprises:
   a. at least a pair of diametrically opposed detent recesses, each disposed at 90° to the anterior and posterior column of parallel recesses;
   b. a detent biaser, operably coupled to each recess; and
   c. a detent member, operably coupled to the biaser, the detent member configured to be received in and engage an apically beveled circumferential groove disposed toward the base of the nested member, thereby preventing the apical movement of the nested tubular member beyond a predetermined axial position of the apically beveled circumferential groove.

19. The method of claim 17, wherein the predetermined axial position of the apically beveled circumferential groove is configured to provide a minimum axial overlap of the nested tubular member and the nesting member of between 5% and 10%.

\* \* \* \* \*